July 10, 1934.  O. G. SCHLOBOHM  1,965,991
STEERING MECHANISM FOR AGRICULTURAL MACHINES
Filed Jan. 3, 1934  3 Sheets-Sheet 2

Inventor

Otto G. Schlobohm

By Clarence A. O'Brien
Attorney

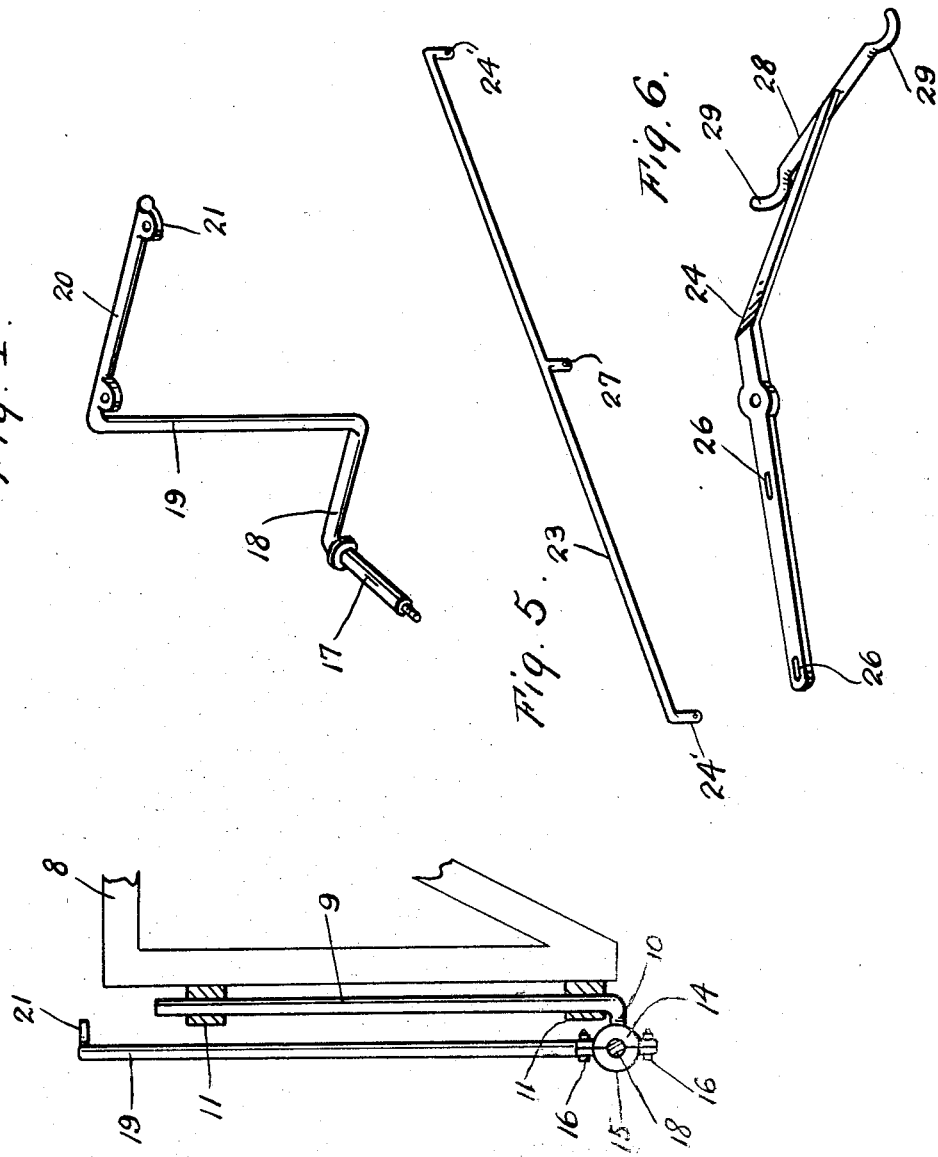

Patented July 10, 1934

1,965,991

UNITED STATES PATENT OFFICE 1,965,991

STEERING MECHANISM FOR AGRICULTURAL MACHINES

Otto G. Schlobohm, Farm, Iowa

Application January 3, 1934, Serial No. 705,140

2 Claims. (Cl. 280—87.1)

The present invention relates to a steering mechanism for an agricultural machine such as a corn plow or the like and has for its prime object to provide a structure for mounting the frame on wheels in such a manner that the wheels may be steered and the machine such as a corn plow used more effectively and efficiently.

A further important object of the invention resides in the provision of a mechanism of this nature which is simple in its construction, inexpensive to manufacture and install, thoroughly reliable in use, easy to operate and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:

Figure 3 is a detail section taken substantially on the line 3—3 of Figure 1.

Figure 4 is a perspective view of one of the spindles.

Figure 5 is a perspective view of one of the connecting rods, and

Figure 6 is a perspective view of the steering lever.

Figure 1:
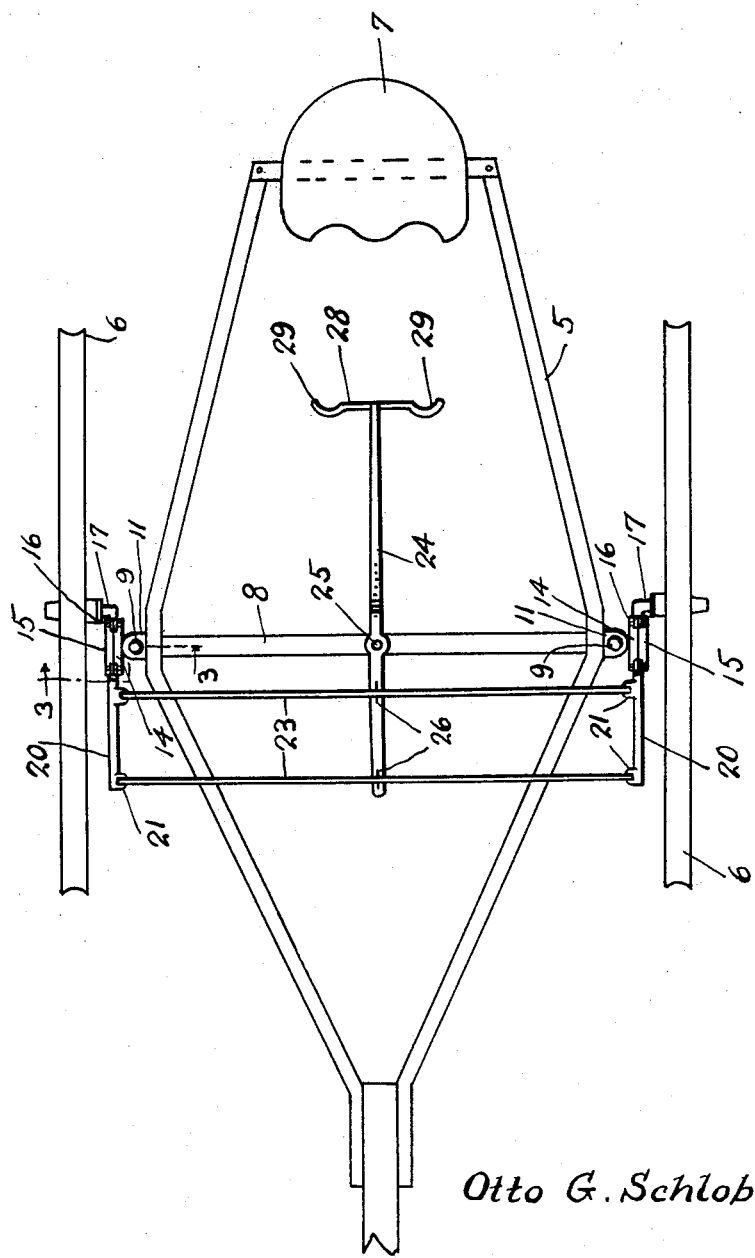
Figure 1 is a top plan view of the mechanism showing the same in use.
Figure 2:
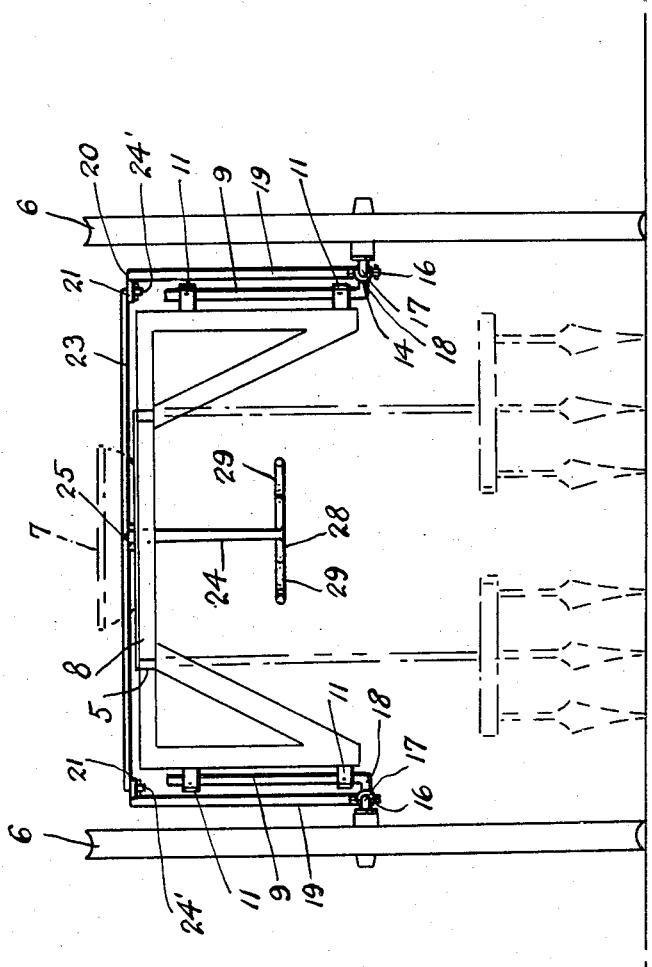
Figure 2 is a rear elevation thereof.

Referring to the drawings in detail it will be seen that the numeral 5 denotes a frame of any type such as is used on a corn plow or other agricultural machine. Numerals 6 denote a conventional wheel and numeral 7 a conventional seat. The frame 5 includes a cross member 8.

Coming now to my improved mechanism it will be seen that a pair of brackets 9 are rockably mounted to the sides of the frame 5. Each bracket is of substantially L-shaped formation comprising a long leg 9 and a short leg 10. The long leg 9 is rockably mounted on the frame by any suitable means 11 so as to be vertically disposed with the short leg 10 extending outwardly and laterally. A clamp is mounted on the short leg 10 and comprises a pair of sections 14 and 15, the former fixed to the leg 10 and the latter detachably engaged with the section 14 by suitable bolts 16 or the like.

There are a pair of spindles each comprising an axle portion 17 from which projects at a right angle and forwardly an arm 18 merging into an upwardly extending arm 19 which in turn merges into a forwardly directed horizontal arm 20 having a pair of apertured ears 21. The arm 18 is received in the clamp between the sections 14 and 15. One of the wheels 6 is mounted on each axle 17 and by rocking the arm 18 in the clamp bearing the wheel may be tilted to the desired angle so as to help keep the middle of the plow frame over the row of crop to be plowed. A pair of connecting rods 23 have end detents 24 receivable in the apertured ears 21. A steering lever 24' is rockable intermediate its ends as at 25 on the cross member 8 and has a pair of slots 26 for receiving central detents 27 on the connecting rods 23. A foot member 28 is mounted on the rear end of the lever 25 and has feet receiving portions 29 on the ends thereof so that a person on the seat 7 may place his feet in the portions 29 and rock the lever 24 thereby steering and tilting the wheels 6.

It is thought that the construction, operation, utility and advantages of this invention will now be quite apparent to those skilled in this art without a more detailed description thereof.

The present embodiment of the invention has been described in considerable detail merely for the purpose of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In combination, a frame, a pair of wheels, a pair of spindles, a pair of brackets including clamps, said spindles including axles, wheels on the axles, arms extending horizontally from the axle, clamps for receiving the horizontal arms, means for mounting the clamps on the frame, vertical arms rising from the horizontal arms, said horizontal arms projecting from the vertical arms and having apertured ears, connecting rods having detents receivable in the apertured ears, and means for moving the connecting rods to swing the spindles.

2. In combination, a frame, a pair of wheels, a pair of spindles, a pair of brackets including clamps, said spindles including axles, wheels on the axles, arms extending horizontally from the axle, clamps for receiving the horizontal arms, means for mounting the clamps on the frame, vertical arms rising from the horizontal arms, said horizontal arms projecting from the vertical arms and having apertured ears, connecting rods having detents receivable in the apertured ears, and means for moving the connecting rods to swing the spindles, said means comprising a lever having a pin and slot connection with the connecting rods.

OTTO G. SCHLOBOHM.